3,564,019
TETRACYCLIC LACTONE ANTIFUNGAL AGENTS
Chester Eric Holmlund, Silver Spring, Md., Ralph Henry Evans, Jr., Rivervale, N.J., and George Alfred Ellestad, Pearl River, N.Y., assignors to American Cyanamid Company, Stamford, Conn., a corporation of Maine
No Drawing. Filed May 22, 1969, Ser. No. 827,062
Int. Cl. C07d 21/00
U.S. Cl. 260—343.3          4 Claims

ABSTRACT OF THE DISCLOSURE

The new compounds of Formula I:

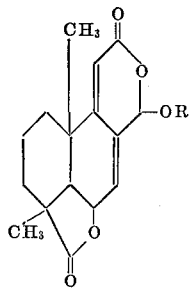

wherein R is hydrogen, acetyl or methyl. All the compounds of this invention have antifungal activity. Compounds represented by Formula I wherein R is hydrogen or methyl are prepared by the cultivation under controlled aerobic conditions of Acrostalagmus species Z1271. The compound of Formula I wherein R is acetyl is prepared by acetylation of the compound of Formula I wherein R is hydrogen.

---

This invention relates to new chemical compounds having antifungal activity and to fermentative and synthetic methods for preparing these compounds.

The invention is, in one aspect, based upon the discovery that the cultivation under controlled conditions, of a previously unisolated strain of fungus of the genus Acrostalagmus leads to the formation of a new antifungally active culture medium. Another aspect of this invention resides in the finding that the active culture medium can be worked up to yield new compounds which have antifungal activity. Other aspects of this invention will be apparent from the ensuing description thereof.

The novel compounds of the present invention are represented by the following general Formula I:

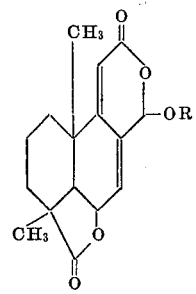

wherein R is hydrogen, acetyl or methyl. The new compounds of Formula I wherein R is hydrogen or methyl are formed during cultivation under controlled conditions of a species of the genus Acrostalagmus which has been given the identification number Z1271. The compound of Formula I wherein R is acetyl is synthesized from the compound of Formula I wherein R is hydrogen. The organism was isolated from a soil sample collected in Wisconsin. A viable culture of the organism has been deposited with the Culture Collection Laboratory, Northern Utilization Research and Development Division, U.S. Department of Agriculture, Peoria, Ill., and has been added to its permanent collection. It is freely available in this repository under its Accession Number NRRL 3481.

Hereinafter, the compound of Formula I wherein R is methyl will be referred to as Z1271α or the alpha component; the compound of Formula I wherein R is hydrogen will be referred to as Z1271γ or the gamma component; and the compound of Formula I wherein R is acetyl will be referred to as Z1271γ acetate or the acetate component.

The following is a general description of Acrostalagmus sp. (Z1271) based on the diagnostic characteristics observed. The underscored descriptive colors are taken from Jacobson et al., "Color Harmony Manual," 3rd ed., Container Corporation of America, Chicago (1948).

The organism is a higher fungus isolated from a Wisconsin sedge meadow soil. It grows on a variety of artificial media at 20–25° C. Petri dishes of potato-dextrose, malt extract, cornmeal and Czapek's solution agars were inoculated and incubated at ambient room temperature for 14 days. Observations made at frequent intervals during this time are recorded in the description below.

Cultures on potato-dextrose agar were growing slowly (3–4 cm.) in 14 days. Margins were irregularly undulant and submerged. Sporulation was dense in central zones, becoming thin in marginal zones. The aerial mycelium and spores en masse were covert tan (2 ge) to slate tan (2 ig) in central zones, becoming beige (3 ge) in margins. Reverse, black in central areas, becoming yellow maple (3 ng) in a narrow margin. Pink pigment diffused in a small zone around the colonies.

Cultures on malt extract agar were growing slowly (3–4 cm.) in 14 days. The colonies were flat, only slightly elevated and radially furrowed. The colony centers were depressed with the margins irregularly serrated. The aerial mycelium and en masse sporulation were citron gray (1 ge) to griege (1 fe); central areas in olive gray (1 ih). Thin, funiculose, whitish overgrowth imparts a powdery appearance to colonies. Reverse black in central zones, becoming yellowish in a narrow submerged margin. Yellowish pigment diffusing into the medium in a narrow zone.

Cultures on Czapek's solution agar growing slowly, 3–4 cm. in 14 days. Colonies were very thin, whitish and nearly transparent. Insufficient sporulation was produced to influence the color of the colonies.

Cultures on cornmeal agar thin, flat were spreading slowly (4–5 cm.) in 14 days. The colonies were devoid of pigment except in sporulating areas. Sporulating aerial mycelium were mustard brown (2 pi). Sporulation was heaviest in central zones; margins were thin submerged. Reverse, yellowish to olive; no diffusible pigment.

Although sporulation could be found on all media studied, morphology of this feature could be best observed on cornmeal agar. Conidiophores arise as side branches from loosely woven, septate, aerial mycelium and form verticillate complexes 50–100μ long. Conidia are borne at the tips of verticillate branches and are held together in slime drops. Heads become enlarged in heavily sporulating areas and may coalesce into almost solid masses of conidia. Conidia hyaline elliptical to ovoid (2.0–4.0μ x 1.0–1.7μ).

The characteristics observed for Z1271 places it in the genus Acrostalagmus of the order Moniliales. Existing species of this genus have been inadequately described in the literature and attempts to equate the isolate to any of these species have been unsuccessful. In view of the unsettled specific status of the isolate, it will be considered an undetermined species of the genus Acrostalagmus.

It is to be understood that for the production of the above-identified novel compounds, the present invention is not limited to the use of this particular organism or to organisms fully answering the above growth and microscopic characteristics which are given for illustrative purposes. In fact, it is desired and intended to include the production of these compounds through the use of mutants produced from the described organism by various mutating means, such as by X-radiation, ultraviolet radiation, nitrogen mustard and the like.

THE FERMENTATION PROCESS

Cultivation of Aaerostalagmus species Z1271 may be carried out in a wide variety of liquid culture media. Media which are useful for the production of the novel compounds include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations such as potassium, sodium, calcium, sulfate, phosphate, chloride, etc. Trace elements such as boron, molybdenum, copper, etc., are supplied as impurities of other constituents of the media. Aeration in tanks and bottles is provided by forcing sterile air through or onto the surface of the fermenting medium. Agitation in tanks is provided by a mechanical impeller. An antifoaming agent such as lard oil may be added as needed.

TANK FERMENTATION

For the production of Z1271 in tank fermentors, the following fermentation medium is regularly used.

|  | Grams |
|---|---|
| Molasses | 20 |
| Cerelose | 10 |
| Bacto-peptone | 5 |
| Water to 1,000 milliliters. |  |

(Adjust with 10 N NaOH to pH 7.0 before sterilization).

Each tank is inoculated with about 3% of the inoculum prepared as described above. Aeration is supplied at the rate of 0.5 to 1.0 liter of sterile air per liter of broth per minute and the fermenting mixture is agitated by an impeller driven at 300 to 800 r.p.m. The temperature is maintained at 25–29° C., usually at 28° C. The fermentation is ordinarily continued for from 130–165 hours at which time the mash is harvested.

ISOLATION PROCEDURE

After the fermentation is completed, the fermented mash containing the novel compounds of this invention is adjusted to about pH 2.5 to pH 4.0. The mixture is filtered, preferably with addition of diatomaceous earth or other conventional filter aid to remove the mycelium. The filtrate is extracted once with ethyl acetate using 500 ml. of solvent for each 1000 ml. of filtrate. Other organic solvents such as chloroform or methylene chloride could likewise be used. The solvent extract is concentrated under reduced pressure to an oily residue. The residue is purified by column chromatography on silica gel. The column charge is prepared by dissolving the oily residue in a suitable solvent such as acetone, ether methylene chloride and the like, adding enough silica gel to absorb the mixture and removing the solvent under reduced pressure. The dry charge is packed on to a column slurry packed with silica gel in hexane. The column is eluted with a gradient between hexane and methylene chloride and finally with a gradient between methylene chloride and ether/methylene chloride (1:4). The column effluent monitored at 255 m$\mu$ using percent transmission is collected in separate fractions of suitable volume. A total of approximately 15 hold back volumes is needed to eluate the novel compounds produced by fermentation. The alpha component is eluted first and corresponds to the first absorbancy peak. The gamma component corresponds to the second and relatively smaller peak. Appropriate fractions of eluate are pooled keeping the components separate and concentrated under reduced pressure to yield oils from which crystals of the alpha or gamma components can be obtained by the addition of a mixture of acetone and hexane. Another equally effective procedure for obtaining both of these compounds involves the extraction with methanol of the filter pad from the fermented mash filtration. In this procedure the methanol extract is concentrated to an aqueous phase under reduced pressure and extracted with suitable solvents as above. The extract is concentrated in vacuo to a residue and chromatographed on silica gel as described above.

Optionally the compound of Formula I wherein R is hydrogen may be obtained by direct crystallization from the solvent extract of the fermentation mash filtrate although such direct crystallization results in considerably smaller yield.

INOCULUM PREPARATION

Shaker flask inoculum of Acrostalagmus sp., culture Z1271 is prepared by inoculating 100 milliliters of sterile liquid medium in 500 milliliter flasks with scrapings or washings of spores from an agar slant of the culture. The following medium is ordinarily used.

|  | Grams |
|---|---|
| Cerelose | 20 |
| Soy fluor X200 | 10 |
| Corn steep liquor | 5 |
| Calcium carbonate | 3 |
| Water to 1,000 milliliters. |  |

The flasks are incubated at a temperature from 25 to 29° C., preferably 28° C. and agitated vigorously on a rotary shaker for 48 to 72 hours. These 100 milliliter inocula are used to inoculate one liter and twelve liter and twelve liter batches of the same medium in 2-liter and 20-liter glass fermentors. The inoculum mash is aerated with sterile air while growth is continued for 30 to 48 hours. These batches of inocula are used to inoculate tank fermentors.

PROPERTIES AND USES

Table I, below, shows the in vitro antifungal activity data of the alpha, gamma and gamma acetate components using an agar dilution streak procedure. The table shows the minimal inhibitory concentration of the novel compounds and chemical derivative required to inhibit the growth of representative fungi in a nutrient medium.

TABLE I

[In vitro antifungal activity—minimal inhibitory concentrations in micrograms/milliliter]

| Fungi | Compound of Formula I wherein— | | |
|---|---|---|---|
|  | R=methyl (Z1271α) | R=hydrogen (Z1271γ) | R=acetyl (Z1271γ-acetate) |
| Candida albicans E83 | 31 | >100 | >100 |
| Cryptococcus neoformans E138 | 15 | >100 | >100 |
| Trichophyton mentagrophytes E10 | 15 | >100 | >100 |
| Trichophyton tonsurans E11 | 6.2 | >100 | >100 |
| Trichophyton rubrum E93 | 15 | >100 | >100 |
| Microsporum canis E55 | 6.2 | >100 | >100 |
| Microsporum gypseum ATCC 14683 | 15 | >100 | >100 |

Additionally, the alpha component shows in vitro antiviral activity. Fifty percent inhibition of cytopathic effects of Coxsackie A21 (Coe) virus is obtained at a concentration of 0.1 gamma/milliliter of this compound. Fifty percent inhibition of the protozoan *Tetrahymena pyriformis* is obtained at a concentration of 0.25 gamma/milliliter of this compound.

The gamma and gamma acetate components also show in vitro anti *Tetrahymena pyriformis* activity. Fifty percent inhibition of *Tetrahymena pyriformis* is obtained with 125 gamma/milliliter of the gamma component or with 35 gamma/milliliter of the gamma acetate component.

The following examples are presented to illustrate this invention.

EXAMPLE 1

Inoculum preparation

The medium used to grow the primary inoculum was prepared according to the following formula:

| | Grams |
|---|---|
| Cerelose | 20 |
| Soy flour X200 | 10 |
| Corn steep liquor | 5 |
| Calcium carbonate | 3 |

Water to 1,000 milliliters.

The washed or scraped spores from an agar slant of Acrosalagmus sp. (X1271) were used to inoculate a 500 milliliter flask containing 100 milliliters of the above sterile medium. The flask was then placed on a rotary shaker and agitated vigorously for 72 hours at 28° C. The resulting flask inoculum was transferred to a 2-liter glass fermentor containing 1 liter of the sterile medium. The glass fermentor was aerated with sterile air while growth was carried out for about 48 hours, after which time the contents were used to seed a 30 liter tank fermentor.

EXAMPLE 2

Fermentation

A fermentation medium was prepared according to the following formula:

| | Grams |
|---|---|
| Molasses | 20 |
| Cerelose | 10 |
| Bacto-peptone | 5 |

Water to 1,000 milliliters.

Before sterilization the pH of the medium was adjusted with NaOH to 7.0. The fermentation medium was sterilized at 120° C. with steam at 20 pounds pressure for 45–60 minutes. The pH of the medium after sterilization was about 6.0. Thirty liters of sterile medium in a 40 liter tank fermentor was inoculated with 1 liter of inoculum prepared as described in Example 1. The fermentation was carried out at 28° C. using Hodag LG–8 oil as a defoaming agent. Aeration was supplied at the rate of 0.7 liter of sterile air per liter of mash per minute. The mash was agitated by an impeller driven at about 800 revolutions per minute. After approximately 162 hours of fermentation time, the mash was harvested.

EXAMPLE 3

Isolation of Z1271α

Thirty liters of fermented mash were adjusted to pH 3.0 with dilute hydrochloric acid and about 1% (w./v.) of diatomaceous earth filter aid was added. The mash was filtered and the filter pad was washed with 4 liters of water. The filtrate and wash were pooled (volume 27 liters) and extracted with about 13.5 liters of ethyl acetate and the extract was concentrated under reduced pressure to 9.5 g. of an oily residue. Sufficient acetone was added to dissolve the oil and 50 g. of silica gel was added to the solution. The solvent was removed under reduced pressure at about 50° C. and the dry silica gel was charged onto a silica gel (500 g.) column slurry packed in hexane. The column was eluted successively with a gradient between 1 liter of hexane and 1 liter of methylene chloride; and a gradient between 4 liters of methylene chloride and 4 liters of a mixture of 1 part ether and 4 parts methylene chloride. The column effluent was monitored at 255 mμ using percent transmission and separate fractions of 75 ml. were collected. The effluent fractions comprising the first eluted peak and containing Z1271α were combined and concentrated under reduced pressure to a small volume. Addition of hexane to the concentrate precipitates crystalline Z1271α which was separated by filtration and dried, weight 1.6 g., M.P. 213–214° C.

EXAMPLE 4

Isolation of Z1271α and Z1271γ

The mycelium pad from the mash filtration described in Example 3 was slurried with methanol. The suspension was filtered and the methanolic concentrate was concentrated to an aqueous phase under reduced pressure. Mycelium pads from two additional 30-liter mash filtrations were treated in a similar manner and the aqueous concentrates were combined and extracted twice with chloroform using 500 ml. of chloroform per 1000 ml. of concentrate. The chloroform extracts were combined, dried over anhydrous sodium sulfate and concentrated under reduced pressure to an oily residue (weight 30.5 g.). The oil was dissolved in methylene chloride and chromatographed on a silicage column (300 g.) slurry-packed in methylene chloride. The column was developed with 1 liter of methylene chloride followed by ag radient between 5 liters of methylene chloride and 5 liters of a mixture of 1 part ether and 4 parts methylene chloride. The effluent was monitored at 255 mμ using percent transmission. The effluent comprising the first peak was concentrated under reduced pressure to a small volume and 1.53 g. of Z1271α was recovered by crystallization. The fractions corresponding to the second peak were likewise concentrated to a small ovlume and 0.265 g. of Z1271γ was recovered following crystallization on the addition of hexane, M.P. 241–247° C.

EXAMPLE 5

Preparation of Z1271γ acetate

One hundred milligrams of crystalline Z1271γ was dissolved in 3 ml. of pyridine and 1 ml. of acetic anhydride was added to the mixture. The mixture was allowed to stand for 1 hour after which time it was diluted with cold dilute hydrochloric acid. The aqueous acid solution was extracted with two portions of ether (each portion equal to volume of acid solution). The pooled extracts were washed with water, dried over anhydrous sodium sulfate and concentrated to a small volume. A crystalline precipitate was obtained on the addition of hexane, weight 40 mg., M.P. 205–210° C.

What is claimed is:

1. The compound of the formula:

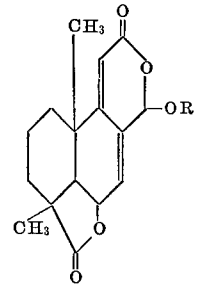

wherein R is hydrogen, methyl or acetyl.

2. The compound of claim 1 wherein R is hydrogen.
3. The compound of claim 1 wherein R is methyl.
4. The compound of claim 1 wherein R is acetyl.

References Cited

UNITED STATES PATENTS 3,244,729  4/1966  Eymard _____ 260—343.2

ALEX MAZEL, Primary Examiner

A. M. TIGHE, Assistant Examiner

U.S. Cl. X.R.

260—343.2; 195—8; 424—279